US007702625B2

(12) United States Patent
Peterson et al.

(10) Patent No.: US 7,702,625 B2
(45) Date of Patent: Apr. 20, 2010

(54) BUILDING A UNIFIED QUERY THAT SPANS HETEROGENEOUS ENVIRONMENTS

(75) Inventors: Trenten Peterson, Florence, TX (US); Hardeep Singh, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 274 days.

(21) Appl. No.: 11/368,293

(22) Filed: Mar. 3, 2006

(65) Prior Publication Data
US 2007/0208723 A1 Sep. 6, 2007

(51) Int. Cl.
G06F 7/00 (2006.01)
G06F 17/30 (2006.01)
(52) U.S. Cl. .......................................... 707/4
(58) Field of Classification Search .................. 707/3, 707/4
See application file for complete search history.

(56) References Cited

U.S. PATENT DOCUMENTS

| | | | |
|---|---|---|---|
| 5,418,950 A | 5/1995 | Li et al. | |
| 5,619,688 A | 4/1997 | Bosworth et al. | |
| 5,798,757 A | 8/1998 | Smith | |
| 5,828,376 A | 10/1998 | Solimene et al. | |
| 5,832,481 A | 11/1998 | Sheffield | |
| 5,870,739 A * | 2/1999 | Davis et al. | 707/4 |
| 6,052,121 A | 4/2000 | Webster et al. | |
| 6,578,046 B2 * | 6/2003 | Chang et al. | 707/103 R |
| 6,760,720 B1 | 7/2004 | De Bellis | |
| 6,836,857 B2 | 12/2004 | Ten-Hove et al. | |
| 6,871,204 B2 | 3/2005 | Krihnaprasad et al. | |
| 6,957,214 B2 * | 10/2005 | Silberberg et al. | 707/4 |
| 2001/0047372 A1 | 11/2001 | Gorelik et al. | |
| 2002/0059566 A1 | 5/2002 | Delcambre et al. | |
| 2003/0018644 A1 | 1/2003 | Bala et al. | |
| 2003/0154191 A1 | 8/2003 | Fish et al. | |
| 2003/0212664 A1 * | 11/2003 | Breining et al. | 707/3 |
| 2004/0006765 A1 | 1/2004 | Goldman | |

(Continued)

FOREIGN PATENT DOCUMENTS

EP 0491517 A2 6/1992

(Continued)

OTHER PUBLICATIONS

David, "ANSI SQL Hierarchical Processing can fully Integrate Native XML," SIGMOD Record, v.32, n.1, pp. 41-46, Mar. 2003.

(Continued)

*Primary Examiner*—James Trujillo
*Assistant Examiner*—Jorge A Casanova
(74) *Attorney, Agent, or Firm*—Kali Law Group, P.C.

(57) ABSTRACT

A unified query building system generates a source structure comprising nodes from a data structure input of an identified data source, displays the generated source structure in a logical view, adds a selected node or element from the nodes to a design query canvas, generates a query object from the selected node based on a source type of the selected node, presents a logical view of a query function of a selected query object, and generates a unified query comprising the generated query objects. The logical view is displayed in a graphical user interface comprising a design query canvas comprising grids corresponding to functions in a query language such as SQL or XML. The generated unified query is displayed in an actual query view and is outlined in a query outline view.

19 Claims, 12 Drawing Sheets

U.S. PATENT DOCUMENTS

| | | | |
|---|---|---|---|
| 2004/0068487 | A1 | 4/2004 | Barton et al. |
| 2004/0111388 | A1 | 6/2004 | Boiscuvier et al. |
| 2004/0153995 | A1 | 8/2004 | Polonovski |
| 2004/0167915 | A1 | 8/2004 | Sundararajan et al. |
| 2004/0181543 | A1* | 9/2004 | Wu et al. ............ 707/102 |
| 2004/0193579 | A1 | 9/2004 | Dettinger et al. |
| 2004/0205577 | A1 | 10/2004 | Abe et al. |
| 2005/0015363 | A1* | 1/2005 | Dessloch et al. ............ 707/3 |
| 2005/0097084 | A1 | 5/2005 | Balmin et al. |
| 2005/0149343 | A1* | 7/2005 | Rhoads et al. ............ 705/1 |
| 2005/0165866 | A1 | 7/2005 | Bohannon et al. |
| 2005/0171976 | A1 | 8/2005 | West et al. |
| 2005/0210002 | A1 | 9/2005 | Pal et al. |
| 2005/0234680 | A1 | 10/2005 | Dettinger et al. |
| 2005/0234889 | A1 | 10/2005 | Fox et al. |
| 2005/0257201 | A1 | 11/2005 | Rose et al. |
| 2005/0289125 | A1* | 12/2005 | Liu et al. ............ 707/3 |

OTHER PUBLICATIONS

"Create XML Views of Relational Data using SQL/XML," printed from the following URL: http://www.stylusstudio.com/connect_for_sql_xml.html on Mar. 3, 2006.

Qu, "Integrating XQuery-Enabled SCORM XML Metadata Repositories into an RDF-Based E-Learning P2P Network," Educational Technology & Society, v.7, n.2, Apr. 2004.

Braga et al., "XQBE: A Graphical Interface for XQuery Engines," printed from the following URL: http://dbgroup.elet.polimi.it/xquery/papers/XQBE-EDBT04.pdf on Mar. 3, 2006.

"SQL/XML in JDBC Applications," DataDirect Technologies, White Paper, Jun. 17, 2004.

Bernknopf, "Developing XML Applications using Oracle 9i's XML DB Facility," Technical Advantage Associates, printed from the following URL: http://www.nyoug.org/200312bernknopf.pdf on Mar. 3, 2006.

Zhang et al., "Rainbow: Multi-XQuery Optimization Using Materialized XML Views," ACM, SIGMOD 2003, Jun. 9-12, 2003.

Bhambhri, "Firing up the Hybrid Engine," DB2 Magazine, printed from the following URL: http://www.db2mag.com/shared/printableArticle.ihtml?articleID=167100937 on Mar. 3, 2006.

"iWay Adapter Manager," printed from the following URL: http://www.iwaysoftware.com/products/pdf/iAMfactsheet.pdf, on Mar. 3, 2006.

Mangtani et al., "Liquid Data: XQuery-Based Enterprise Information Integration," Bea Systems, 2003, printed from URL: http://dev2dev.bea.com/pub/a/2004/11/Mangtani.html) on Mar. 3, 2006.

"Bea AquaLogic Data Services Platform," BEA System Inc. 2005.

"DataMirror: Features and Benefits," printed from the following URL: "http://www.datamirror.com/products/tserver/features.aspx" on Mar. 3, 2006.

"Notice of Opinion of First Examination", Chinese Patent Office, (Jun. 13, 2008), 6 pp plus Chinese version.

* cited by examiner

BUILDING A UNIFIED QUERY THAT SPANS HETEROGENEOUS ENVIRONMENTS

CROSS-REFERENCE TO RELATED APPLICATIONS

The present application relates to U.S. patent application, titled "System and Method for Generating an Xpath Expression," Ser. No. 11/368,292, which is filed concurrently herewith, and to co-pending U.S. patent application, titled "Query Builder Using Context Sensitive Grids," Ser. No. 10/985,431, filed on Nov. 10, 2004, both of which applications are assigned to the same assignee as the present application.

FIELD OF THE INVENTION

The present invention generally relates to data storage in structured or semi-structured, or unstructured format. In particular, the present invention relates to a method for generically constructing a unified query for locating and formatting data in one or more heterogeneous environments.

BACKGROUND OF THE INVENTION

Conventional databases store data in tables with columns and rows. In a relational database, tables are related or linked to one another. A new paradigm for databases comprises adding XML data to cells within a relational database. With the addition of native XML support in databases, the queries required to find, manipulate, and publish data stored in a conventional database have become more complex. Not only has the structure of the data changed, the language used to query and publish this data has also changed to support this new database paradigm.

A conventional query language comprises either XQuery to support XML or SQL to support relational databases. To query data in this new database paradigm, XQuery is added to query the XML portions of the relational database. XQuery is capable of querying hierarchical XML data. For a conventional database that is primarily a relational store, the existing SQL querying capabilities remain intact. Besides allowing the ability to publish relational data as XML, additional SQUXML functionality decomposes XML data and publishes the decomposed XML data as a relational table. Added to this functionality, this database paradigm also supports functions that can perform XSL transformations to publish XML data in another XML format.

In general, this new database paradigm can support relational and XML mapping capabilities in querying and publishing language such as, for example, relational structure mapped to XML structure and vice versa, XML structure mapped to XML structure, and relational structure mapped to relational structure.

Conventional databases typically use a conventional query builder to aid a developer or user in the generation of complex queries for a relational database. Although this technology has proven to be useful, it would be desirable to present additional improvements. These conventional query builders are designed for only relational to relational querying and publishing cannot build queries over data structured in the new database paradigm. Users currently build queries that combine aspects of XML and relational searches by bringing up an XQuery builder and a SQL query builder, cutting and pasting partial queries from the XQuery builder and the SQL query builder, and manually integrating the partial queries. Neither the XQuery builder nor the SQL query builder is able to publish relational data as XML or decompose XML data as relational data. Publishing relational data as XML or decomposing XML data as relational data requires a separate mapping tool. Consequently, the process of querying over XML data and relational data is cumbersome; a user is required to build combined queries using more than one tool, each with a different user experience.

What is needed is a unified query builder that queries and publishes across relational data and XML data in a transparent manner such that the development experience of the user does not change with respect to the type of data being queried. The user should be able to store both relational and XML data in a database without understanding the internal storage mechanism. Similarly, the user should be able to query the data and publish the results without having to understand semantic changes in the querying and publishing languages. Provided the user understands the structure of the data, the user should be able to identify any data or any part of the data to query, publish, and modify the data. The present method for building a unified query spans heterogeneous environments from any data source such as, for example, relational databases, XML data stores, web-based data, data feeds, a file system, etc. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for building a unified query that spans heterogeneous environments.

The present system comprises generating a source structure comprising nodes from a data structure input of an identified data source, displaying the generated source structure in a logical view, adding a selected node from the nodes to a design query canvas, generating a query object from the selected node based on a source type of the selected node, presenting a logical view of a query function of a selected query object, and generating a unified query comprising the generated query objects. Any of the selected nodes may comprise a node or an element. The logical view is displayed in a graphical user interface.

The design query canvas comprises a query design view with functions corresponding, for example, to SQL or XML. The design query canvas comprises a return grid and a where grid for generating a query for SQL. The design query canvas comprises, for example purpose only, a for grid, a let grid, a where grid, an order by grid, and a return grid for generating a query for XML. The generated unified query is displayed in an actual query view. An outline of the generated unified query is displayed in a query outline view.

The present system may be embodied in a utility program such as a unified query building utility program. The present system also provides a method for the user to identify a data source by specifying a location of the data source and then invoking the unified query building utility to generate a data structure input. The present system further provides a method for the user to select nodes or elements from the data structure input for inclusion in a unified query. The present system generates objects corresponding to the selected nodes or elements and displays these objects to the user such that the user can select objects for expansion. The present system provides a method by which the expanded objects can be manipulated or otherwise modified by the user. The present system provides a method for the user to invoke the unified query building utility to generate the unified query from the selected nodes or elements.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Data source: any source of data. Examples of data sources comprise a database in any format (relational, XML, etc.), a file system, a web site, web services, a file system, any program, any computer, any network, etc. additionally, the data source may comprise data passed in an argument.

FLWOR: an XQuery expression that contains the following clauses: For, Where, Let, Order By, and Return.

World Wide Web (WWW, also Web): An Internet client-server hypertext distributed information retrieval system.

XML: extensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

XPath (XML PATH): XPath is a W3C.org defined path language for identity nodes in an XML document. It is a sub-language of XSLT and of XML Query used to identify XML elements for processing, to calculate numbers, and to manipulate strings.

XSL (extensible Stylesheet Language): A standard for describing a style sheet for XML documents. XSL comprises XSL Transformations (XSLT), XML Path Language (XPath), and XSL formatting objects (XSL FO). XSL Transformations (XSLT) is the processing language for XSL. XLST is used to convert XML documents into HTML or other document types and may be used independently of XSL. XML Path Language (XPath) is used to identify and select tagged elements within an XML document. XSL Formatting Objects (XSL FO) provides a format vocabulary.

XQuery (XML QUERY Language): A language for querying XML documents. Based on the XQuery data model, XQuery processes a query by parsing an XML document, a schema for the XML document, and the query into hierarchical node trees. XQuery further generates an output schema with the query results.

Figure 1:
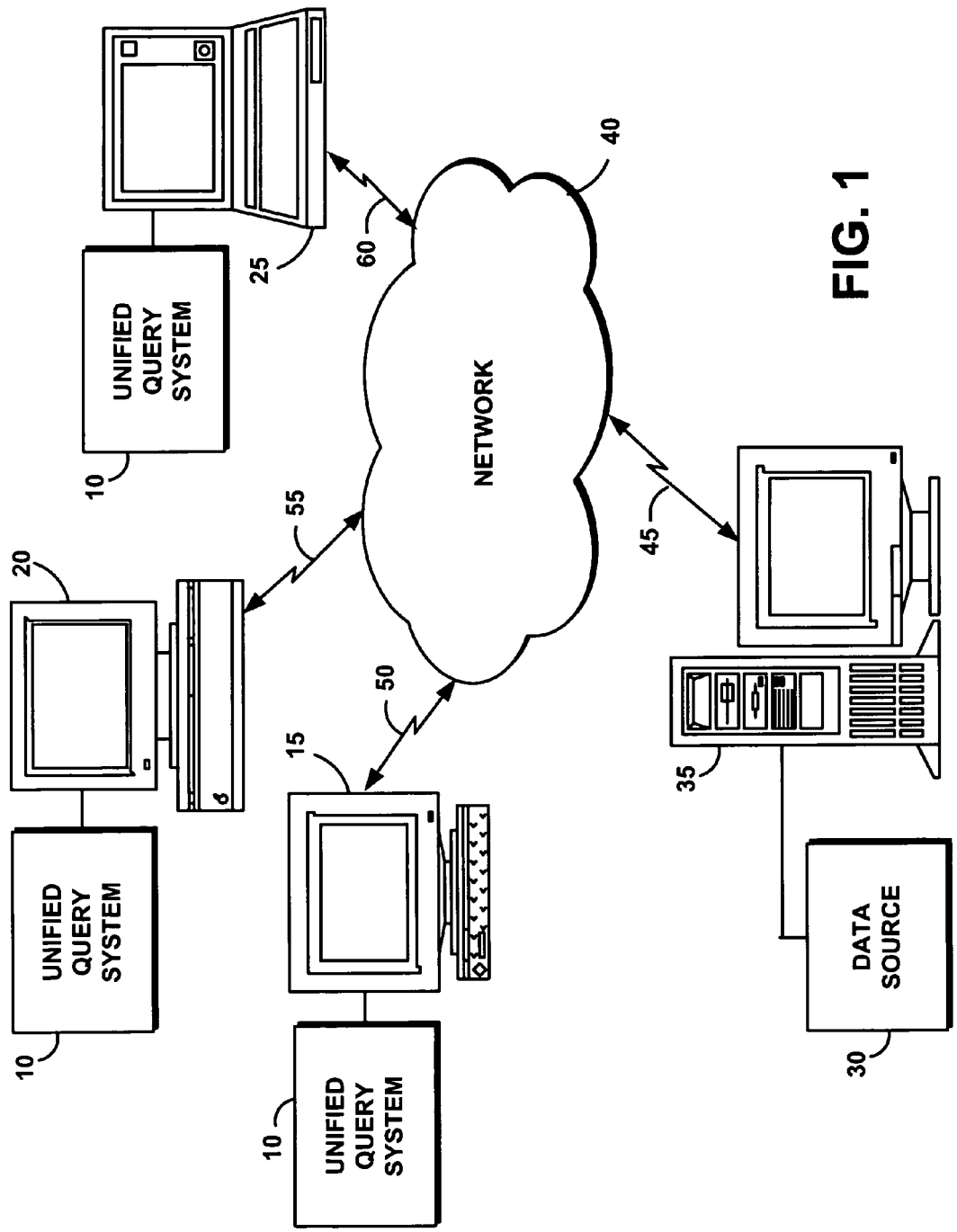
FIG. 1 is a schematic illustration of an exemplary operating environment in which a unified query building system of the present invention can be used.

FIG. 1 portrays an exemplary overall environment in which a system, a service, a computer program product, and an associated method (the "system 10") for building a unified query that spans heterogeneous environments according to the present invention may be used. System 10 comprises a software programming code or a computer program product that is typically embedded within, or installed on a computer such as computers 15, 20, 25. Alternatively, system 10 can be saved on a suitable storage medium such as a diskette, a CD, a hard drive, or like devices.

The present invention can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Users are represented by a variety of computers such as computers 15, 20, 25, and can query data on a source of data such as, for example, a data source 30 or a server 35 through a network 40. Computers 15, 20, 25 each comprise software that allows the user to interface securely with the server 35. The server 35 is connected to network 40 via a communications link 45 such as a telephone, cable, or satellite link. Computers 15, 20, 25, can be connected to network 40 via communications links 50, 55, 60, respectively. While system 10 is described in terms of network 40, computers 15, 20, 25 may also access system 10 locally rather than remotely. Computers 15, 20, 25 may access system 10 either manually, or automatically through the use of an application.

Figure 2:
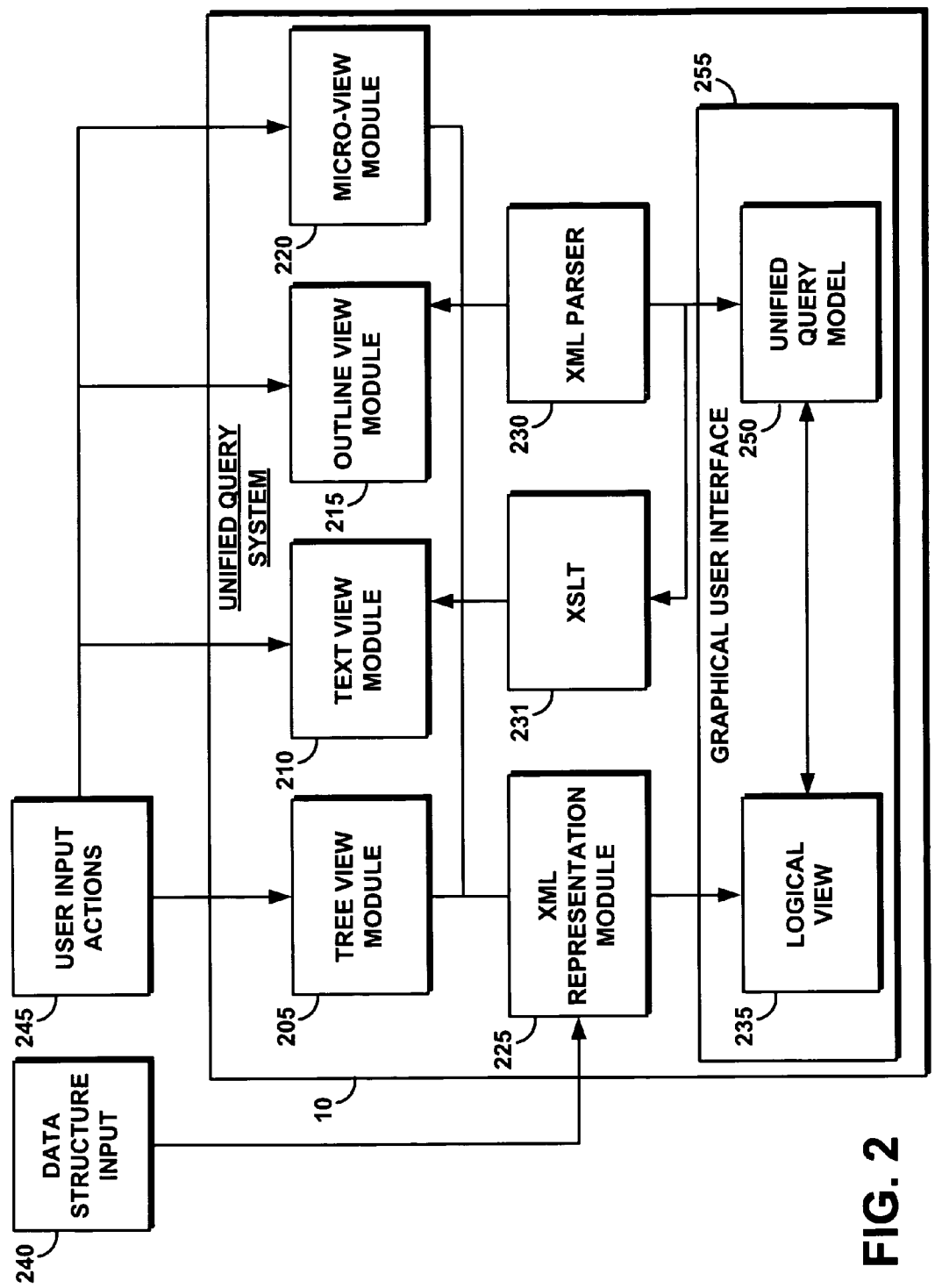
FIG. 2 is a block diagram of the high-level architecture of the unified query building system of FIG. 1.

FIG. 2 illustrates an exemplary high-level hierarchy of system 10. System 10 comprises a tree view module 205, a text view module 210, an outline view module 215, a micro-view module 220, an XML representation module 225, and an XML parser 230. The XML representation module 225 generates a logical view 235 of a data source such as data structure input 240 generated, for example, from a data source such as data source 30, a file structure on server 35, data on the world wide web (WWW) accessible through the network 40, etc. System 10 receives as input user input actions 245 and generates as output a unified query model 250. System 10 presents the unified query model 250 and the logical view 235 in a graphical user interface 255 that may be manipulated by a user. An XSL transformation (XSLT) 231 is implemented on the query model to generate the text view 210.

The tree view module 205 provides a tree view of a source model that enables the user to manipulate the data structure input 240. The tree view of the source model comprises context menus that further allow the user to manipulate the source and query model. The XML parser 230 instantiates the source model as a hierarchy of objects. System 10 generates the query model as an XML structure created by user actions via the graphical user interface 255. The graphical user interface 255 presents to the user one or more views of the unified query model 250. The graphical user interface 255 further comprises one or more controls and actions to build and edit the unified query model 250. As system 10 builds the unified query model 250, the unified query model 250 is modified; system 10 generates a resulting query string and presents the resulting query string in one of the views.

The XML representation module 225 generates an XML representation of the source model from data sources and variables. The text view module 210 generates a text view of a query generated from a query model using, for example, XSLT. The outline view module 215 generates an outline view of a query model that displays a query hierarchy of the query model. The outline view can be used for navigating the unified query model 250 in the graphical user interface 255. The micro-view module 220 generates a micro-view of the query model that allows a user to expand a view in a query model of a logical functional block such as a "SELECT" statement or a "FLWOR" statement. The micro-view displays a sub-tree representing the query model; this sub-tree represents one or more functional blocks as a set of grids. The user can manipulate the micro-view to modify the query.

System 10 develops unified queries such as, for example, SQL queries, SQL/XML queries, XQueries, and XSLT queries across data such as, for example, XML and relational data using interactive methods such as drag and drop in the graphical user interface 255. The XML representation module 225 provides in the logical view 235 a sample structural representation of the data that can be queried as a resource. This structural representation comprises data such as relational data and XML data in the database that is to be queried (i.e., data source 30), relational data and XML data passed as an argument to the query, data in any other data sources such as, for example, a webservice, a file structure, etc., and transient data created inside the query.

The XML representation module 225 blurs the distinction between various and differing data structures by creating the logical view 235 of the sources to be queried. The logical view 235 blurs the lines between related sources, allowing the user to generally view the related sources as one source in the same or a similar format. The XML representation module 225 displays as a single hierarchy the relational tables and columns in the relational data and the XML documents that the relational tables and columns contain. The logical view 235 allows the user to identify any part of the data to search and retrieve, apply transformation on the data before or after retrieval, and perform analytic and computational actions on the data.

System 10 and the graphical user interface 255 utilize a minimal number of user actions, providing an easy-to-use and easy-to-learn graphical interface for generating unified queries from heterogeneous environments. The logical view 235 comprises a common source view represented as a tree; different source types are shown as branches on the tree. The logical view 235 comprises a "design canvas" comprising a set of grids. The grids abstract the language functionality of the unified query by presenting common query language logical constructs via the logical view 235. The user actions comprise a (select and copy) drag or drop action that drags from a tree view of the data structure input 240 to a design grid. The user action further comprises using a context menu. As system 10 generates a unified query with user input, the user receives feedback on each action by viewing the generated unified query and the structure of the generated unified query.

System 10 blurs syntactical differences in the heterogeneous query languages used to query the heterogeneous data sources by allowing the user to act through a logical abstraction of the query shown in the logical view 235. Query languages have similar logical constructs. For example, the "SELECT" clause in SQL is similar to the "FLWOR" expression in XQuery; each has a selection clause, a where clause, etc. Therefore, system 10 abstracts query languages to a similar set of logical constructs. The grid set of the logical view 235 allows the user to manipulate these logical constructs to build a unified query without having to understand the complexities of the underlying languages or how the underlying languages are combined to generate the unified query.

Figure 3:
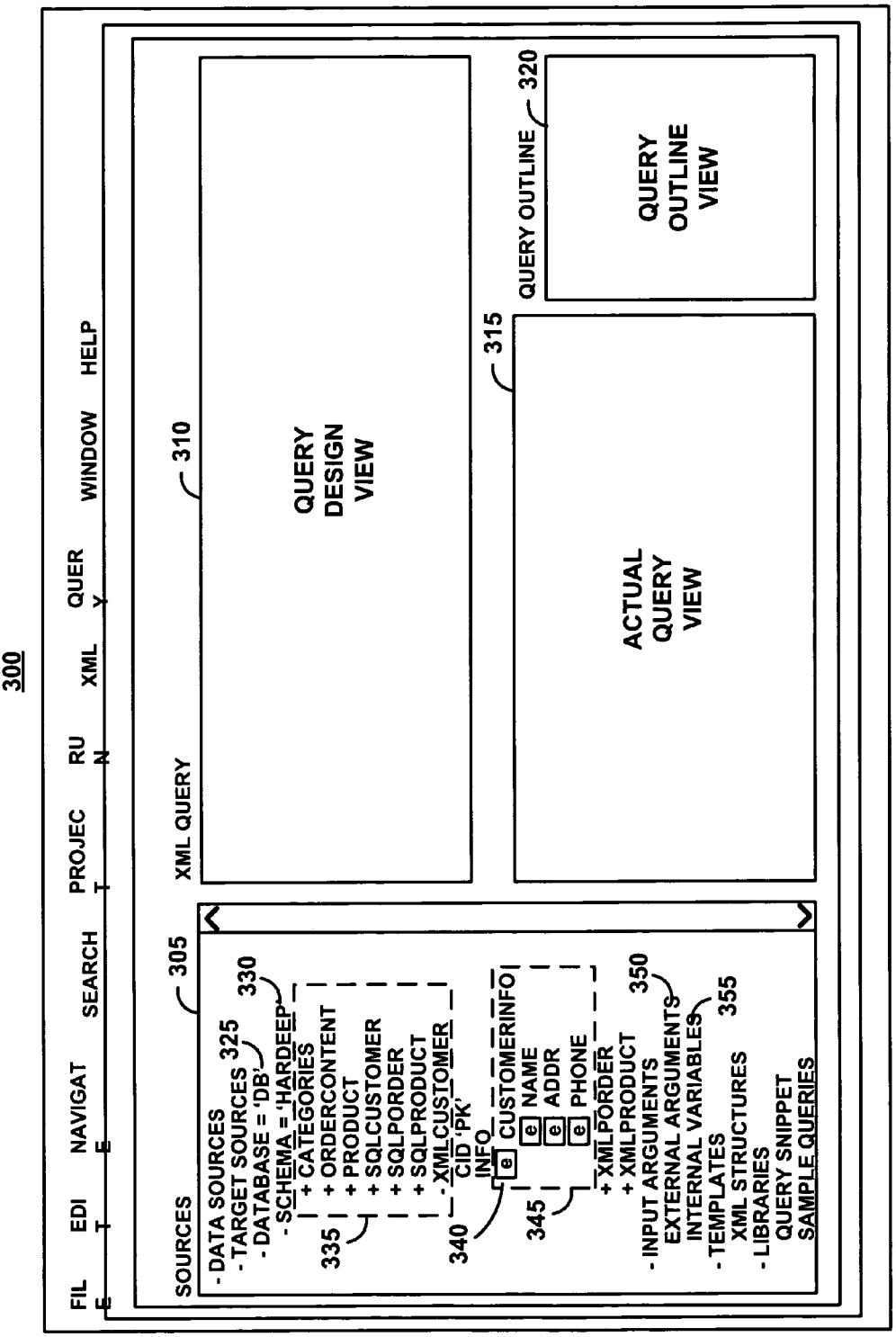
FIG. 3 is an exemplary screen shot illustrating use of the unified query building system of FIGS. 1 and 2 in building in a unified query an XQuery segment for XML data in a relational database.

FIG. 3 illustrates an exemplary screen shot 300 of the graphical user interface 255 comprising a logical view 235 of the data structure input 240 for an exemplary database. The graphical user interface 255 comprises a sources display 305, a query design view 310 (interchangeably referenced herein as a query design canvas 310), an actual query view 315, and a query outline view 320. When system 10 generates a new query using an existing connection to a database such as data source 30, the database schema is queried and added to the source model represented by the data structure input 240. The sources display 305 displays a source tree that is a source model of the data structure input 240.

The expanded view of the sources display 305 in FIG. 3 illustrates tables and a column in the structure of the source data. The database structure is listed as a node 325, "database=db". A schema of the database structure is listed as a node 330, "SCHEMA='HARDEEP'". Tables 335 in the schema "HARDEEP" comprise CATEGORIES, ORDERCONTENT, PRODUCT, SQLCUSTOMER, SQLPORDER, SQLPRODUCT, and XMLCUSTOMER.

Any column of type XML displays the XML data structure of that column, as illustrated by a node 340 labeled "CUSTOMERINFO". XML columns can be expanded to show the structure of the XML data stored in the XML column. For example, node 340 is shown expanded (expanded view 345) to display the structure of the XML data stored in node 340. Sources display 305 further displays any external arguments 350 or internal variables 355. External arguments 350 allow users to add one or more external arguments that can be passed into the query at runtime. For arguments of type XML, system 10 shows the structure of the XML. Internal variables 355 show in scope internal argument structure. As used herein, "in scope" means that an internal variable declared/created inside the query that is visible or usable at any other location in the query. If the variable cannot be used at that point it is not in scope. While sources 305 illustrates a data source structure for a database schema, it should be clear that target sources displayed in sources 305 can be any data source such as, for example, webservices, message queues, http web sites, file structures, etc.

Figure 4:
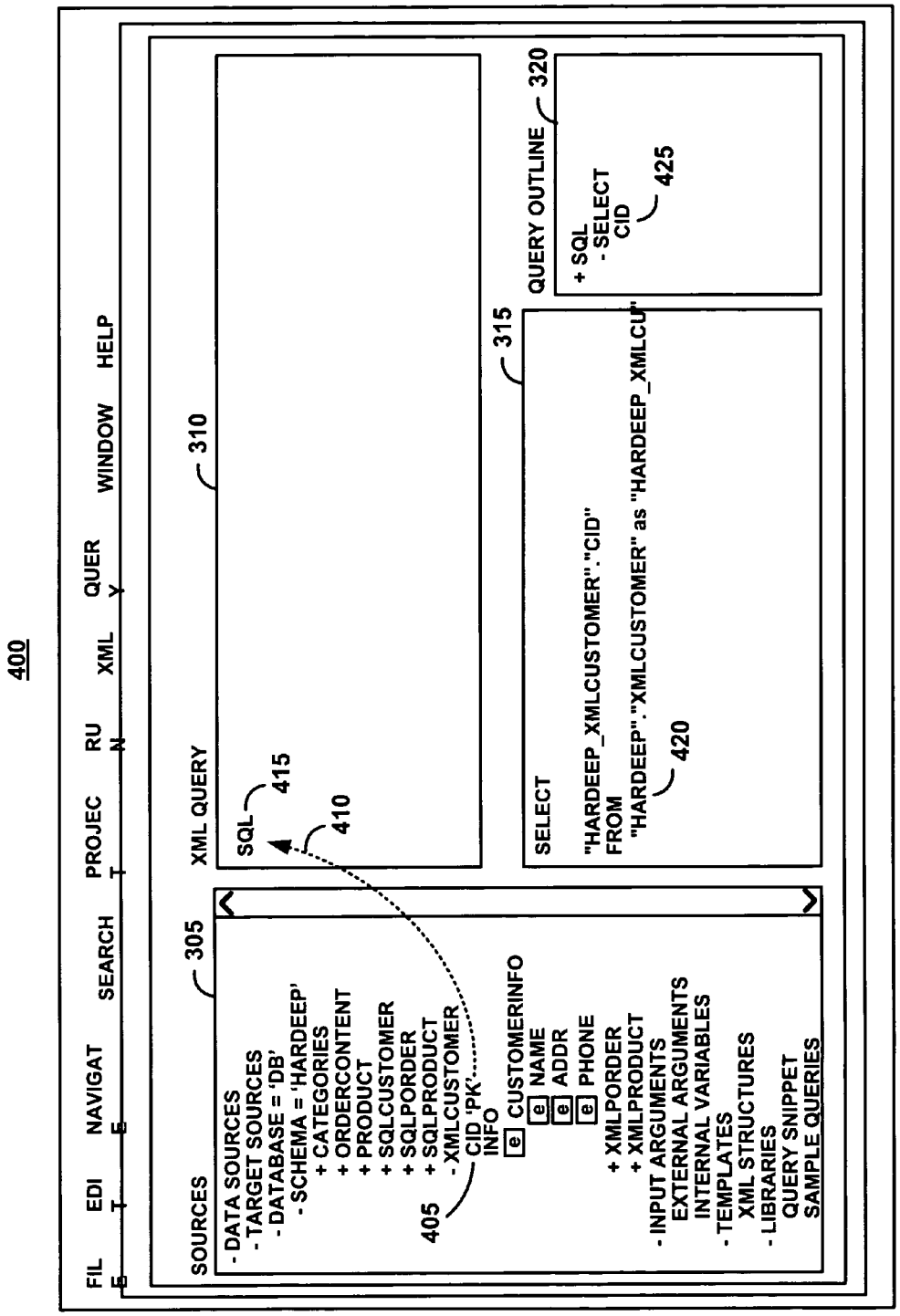
FIG. 4 is an exemplary screen shot illustrating an XQuery segment formed by use of the unified query building system of FIGS. 1 and 2 on XML data in a relational database.

FIG. 4 illustrates an exemplary screen shot 400 in which an SQL query segment is generated by selecting one or more nodes in the source tree shown in sources display 305. To generate a query, a user identifies a node of interest in the source tree such as, for example, node 405 (labeled CID 'PK'). The user selects and drags node 405 to the query design view 310, as indicated by the dashed arrow 410. System 10 identifies node 405 as a database column and generates an SQL statement object in the mode, represented as SQL object 415 in the query design view 310. System 10 generates an object in the query design view 310 based on the type of object that the user drags into the query design view 310. For example, system 10 generates an SQL object for nodes dragged from an SQL data source and an XML object for nodes dragged from an XML data source. The user can see the modified query model in the query design view as SQL object 415, in the actual query view 315 as query text 420, and in the query outline view as query outline 425. The user can expand the SQL object 415 by, for example, selecting the SQL object 415 or selecting an expansion button (not shown).

Figure 5:
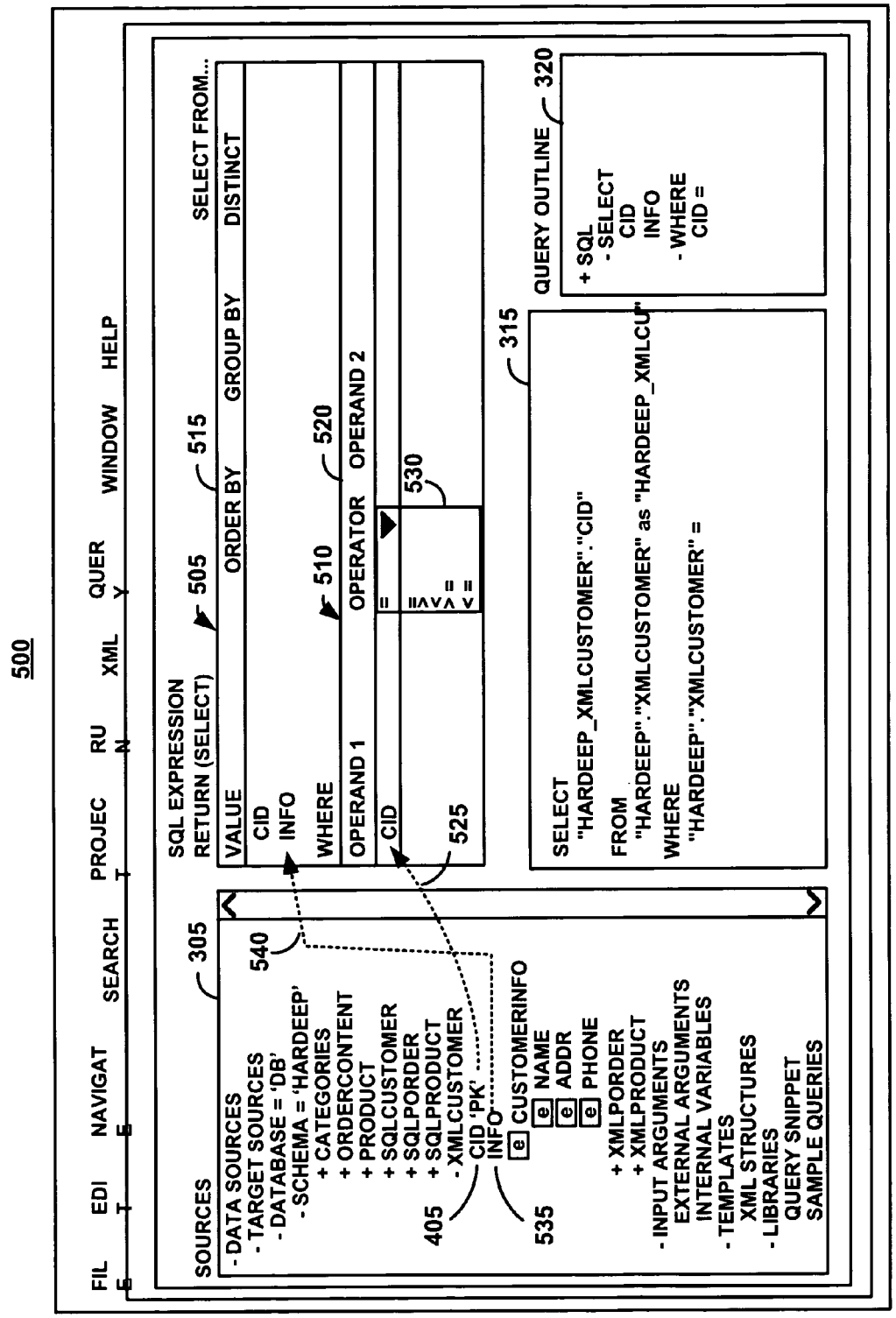
FIG. 5 is an exemplary screen shot illustrating use of the unified query building system of FIGS. 1 and 2 in applying operators to an XQuery segment for XML data in a relational database.

FIG. 5 illustrates an exemplary screen shot 500 in which the SQL object 415 is expanded and operators are applied to an XQuery segment for XML data in a relational database. Screen shot 500 displays a logical view of the query being built by system 10 with interaction from the user. After expansion, the SQL select statement represented by the SQL object 415 of FIG. 4 is represented by a return grid 505 and a where grid 510. The return grid 505 comprises a "return" menu bar 515. The where grid comprises a "where" menu bar 520. The user can drag additional nodes into the return grid 505 or the where grid 510. For example, the user can drag node 405 to the where grid 510, as indicated by the dashed arrow 525. The user can further select an operator such as "=" from a pull-down operator list 530. The user can drag a node 535 (labeled "INFO") to the return grid 505 as indicated by the dashed arrow 540. System 10 generates an SQL select statement comprising node 405 and node 535 and displays the generated statement in the actually query view 315.

Figure 6:
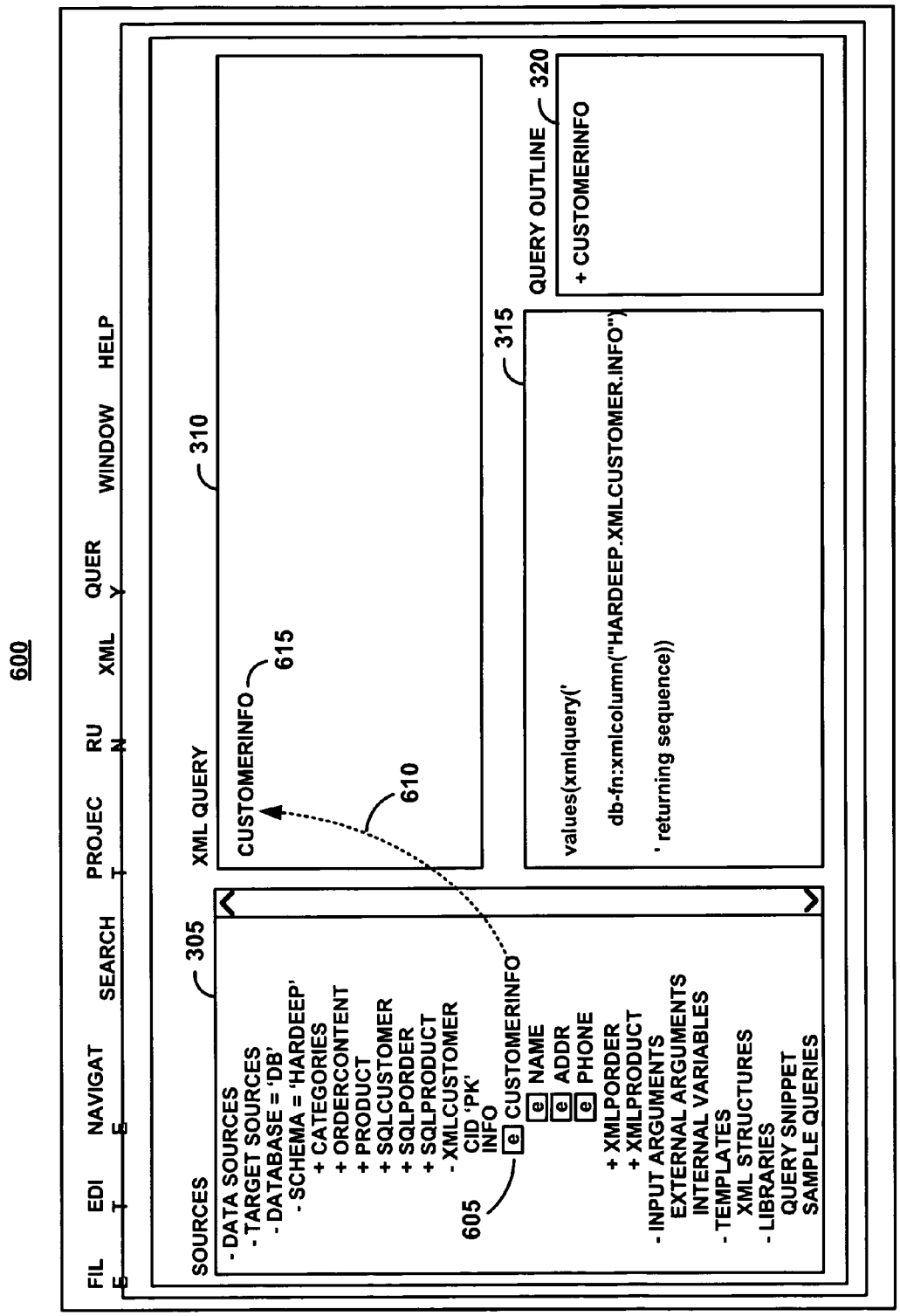
FIG. 6 is an exemplary screen shot illustrating use of the unified query building system of FIGS. 1 and 2 in generating an XPath for an XQuery for XML data in a relational database.

FIG. 6 illustrates an exemplary screen shot 600 displayed by system 10 when generating an XPath for an XQuery for XML data in a relational database. System 10 generates an XQuery in response to a user dragging an XML node from the source tree in the sources display 305 to the query design view 310. As previously discussed, the source tree expands any database column of type XML and shows a sample of the XML data stored in that column. If the user drags a node in this sample XML data to the query design view 310, an XPath object is created in the underlying query model displayed in the actual query view 315. For example, the user drags node 605 (labeled "CUSTOMERINFO") to the query design view 310, as represented by a dashed arrow 610. System 10 forms an XPath object 615, "CUSTOMERINFO". In comparison, system 10 creates an SQL object when the node dragged to the query design view 310 is a column in a source database. System 10 implicitly describes different elements in the unified query based on the source nodes selected, hiding from the user transitions in the storage structure.

Figure 7:
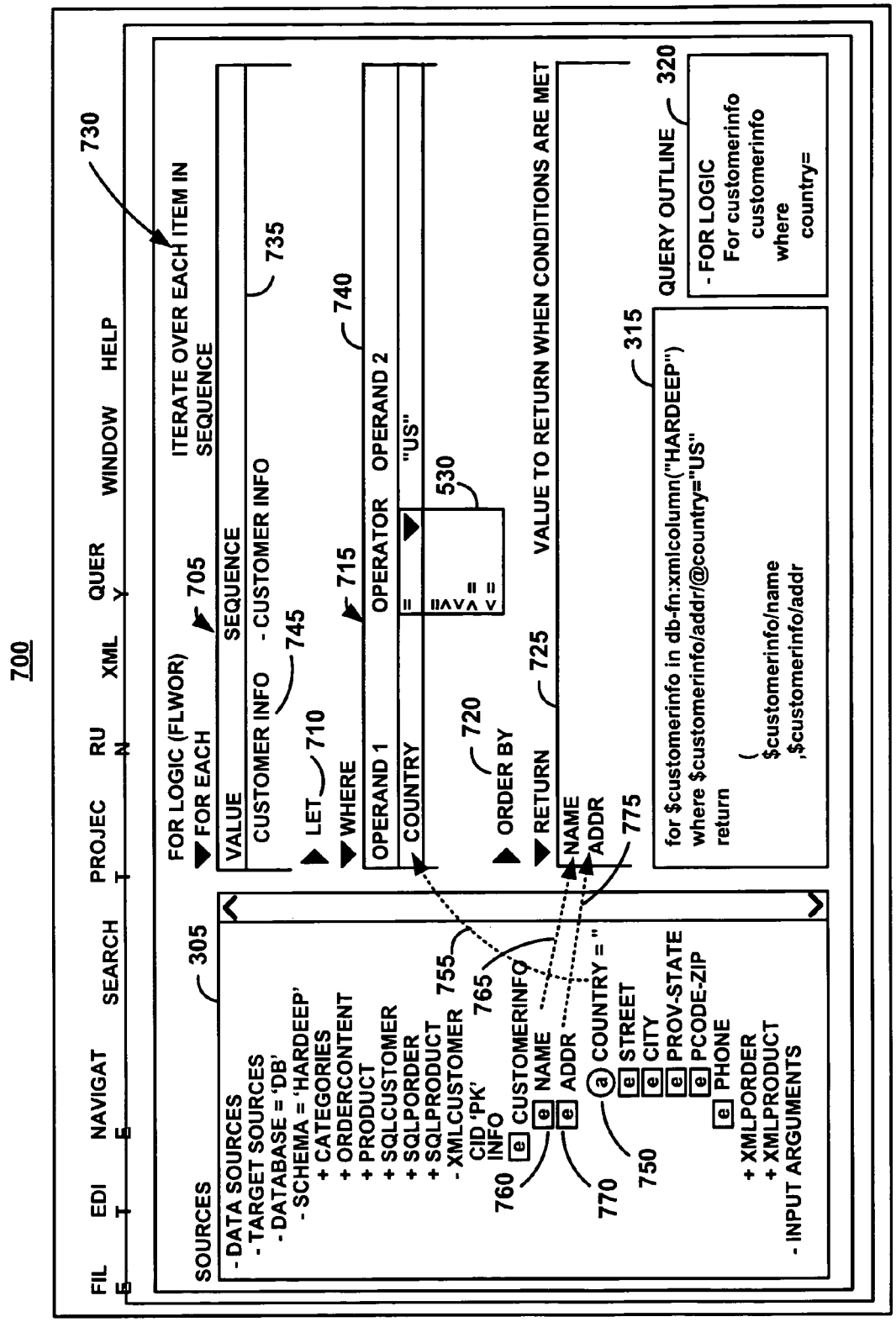
FIG. 7 is an exemplary screen shot illustrating an expanded view generated by the unified query building system of FIGS. 1 and 2 of the XQuery shown in FIG. 6.

FIG. 7 illustrates an exemplary screen shot 700 illustrating an expanded view of an XPath object generated by system 10. The user can expand the XPath object 615 by, for example, selecting the XPath object 615 or selecting an expansion button (not shown). System 10 changes expanded views based on a selected item. If a user selects an SQL object to expand, an expanded SQL screen is shown such as screen shot 500. If a user selects an XPath item to expand, an expanded FLWOR screen is shown such as screen shot 700.

The expanded view of an XPath object comprises a "for" grid 705, a "let" grid 710, a "where" grid 715, an "order by" grid 720, and a "return" grid 725, collectively referenced as FLWOR grids 730. Each of the FLWOR grids 730 can be expanded, as shown by the "for" grid 705, the "where" grid 715, and the "return" grid 725. Alternatively, each of the FLWOR grids 730 can be collapsed, as shown by the "let" grid 710 and the "order by" grid 720. The "for" grid 705 comprises a "for" menu bar 735. The "where" grid 725 comprises a "where" menu bar 740.

The "for" grid 705 loops over nodes at this path. The "for" grid 705 is similar to the return grid 505 that defines all columns over which a loop is performed to obtain rows. The "where" grid 715 specifies search criteria of filters to eliminate unwanted nodes. The "where" grid 715 is similar to the "where" grid 510. The "return" grid 725 identifies one or more nodes to be returned from the query. Unlike a SQL select that implicitly returns all selected rows, a FLWOR loop can return only a subset of selected nodes.

System 10 replaces the XPath object 615 with a FLWOR object 745, labeled "CUSTOMERINFO". The user can drag additional nodes from the sample XML structure to any of the FLWOR grids 730. For example, the user can drag a node 750 (labeled "country=US") to the "where" grid 715, as indicated by a dashed arrow 755. The user can apply an operator to node 750 in the "where" grid 715 by selecting an operand from the pull-down operator list 530. The user can drag a node 760 (labeled "name") to the "return" grid 725, as indicated by a dashed line 765. The user can further drag a node 770 (labeled "addr") to the "return" grid 725, as indicated by a dashed line 775. System 10 generates a query in response to these user actions and displays the query in the actual query view 315. System 10 generates a query outline for the generated query and displays the query outline in the query outline 320.

Figure 8:
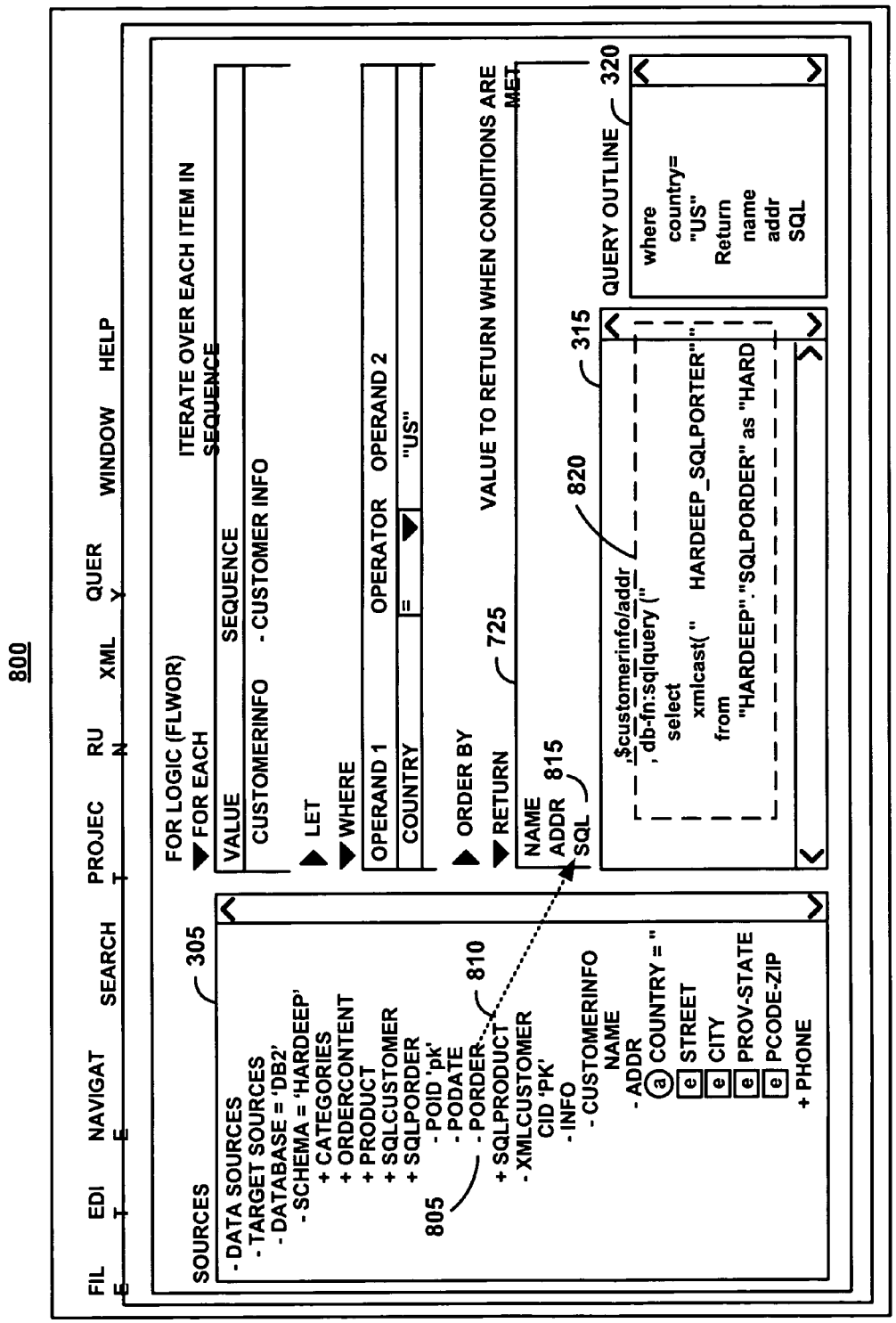
FIG. 8 is an exemplary screen shot illustrating formation by the unified query building system of FIGS. 1 and 2 of an SQL object from the XQuery shown in FIG. 7.

FIG. 8 illustrates an exemplary screen shot 800 in which system 10 embeds an SQL select inside an XQuery. A user drags a node 805 (labeled "PODATE") to the "return" grid 725, as represented by a dashed arrow 810. Node 805 represents a database column. System 10 creates an SQL object 815 in the underlying query model. In the generated unified query, system 10 embeds a select statement in the XQuery, as shown by a query segment 820. The user can expand the SQL object 815 and further refine the SQL. Although the user did not explicitly create an inner SQL, system 10 extrapolates the source type of the dragged node 805 to use SQL instead of XQuery, as indicated by the query segment 820. This abstraction by system 10 from the data structure input 240 to a logical model of the data structure input 240 (a hierarchy) blurs the lines between the source types and allows the user to see and act upon all sources in the same way, making it easier for the user construct a query logic that spans the query sources represented in the data structure input 240.

Figure 9:
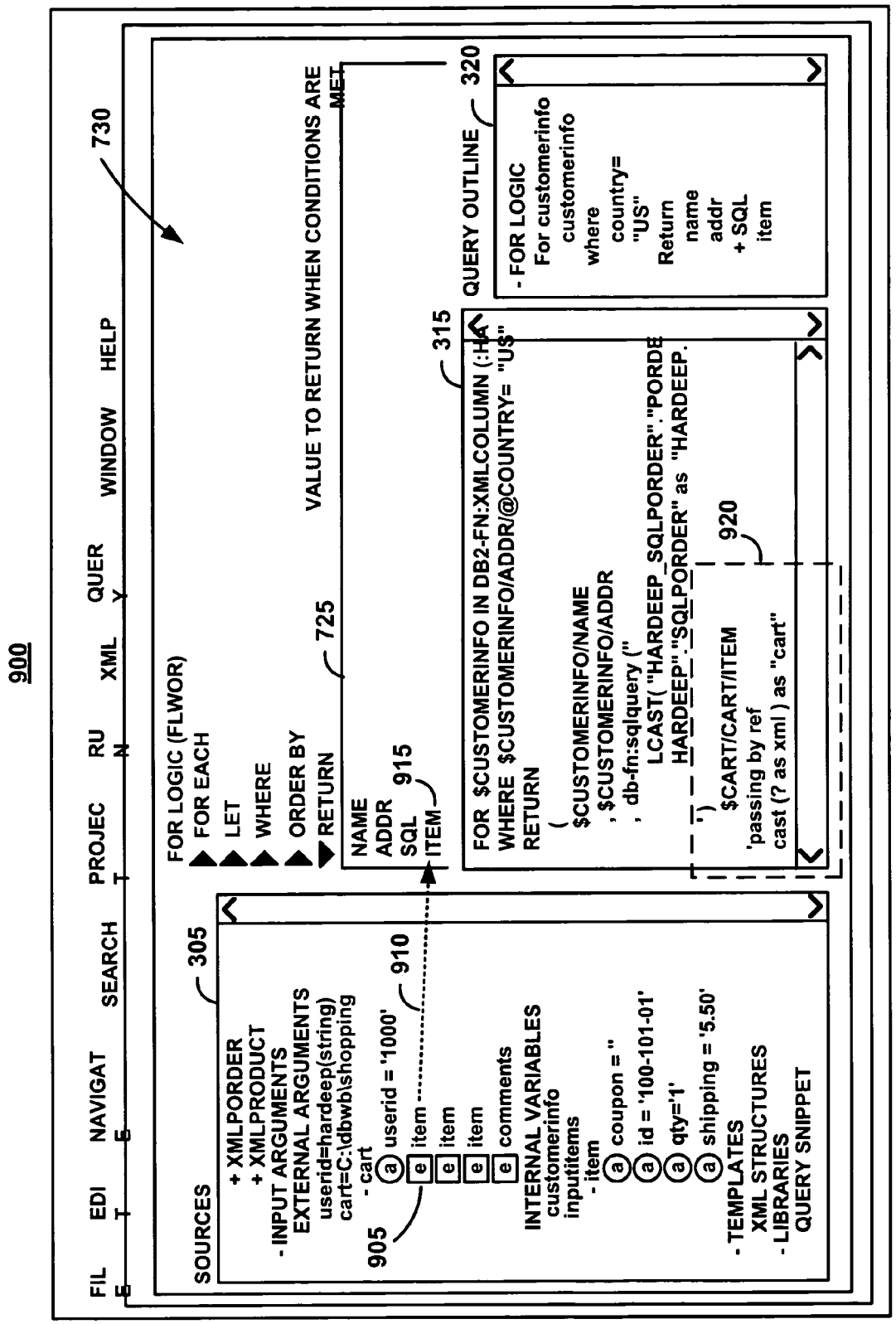
FIG. 9 is an exemplary screen shot illustrating formation by the unified query building system of FIGS. 1 and 2 of a unified query comprising an item from an external argument.

FIG. 9 illustrates an exemplary screen shot 900 in which system 10 embeds a query comprising an item from an external argument in an XQuery. Users can pass XML data into a unified query as a runtime argument and use the XML data in the resulting unified query. System 10 treats a runtime argument passed into a query in the same manner as any other data source. Users can define arguments in the source tree of the sources display 305. These defined arguments are passed to the unified query as runtime parameters. For example, a node 905 (labeled "item") representing an XML document is added to the source tree as an external argument. Since the argument is of XML type it expands to show XML document structure in the source tree. The user can drag and drop nodes from this structure to any of the FWLOR grids 730 to create an XPath object in the unified query model displayed in the actual query view 315. As used herein, FWLOR refers to an XQuery expression that contains the following clauses: For, Where, Let, Order By, and Return.

For example, a user drags a node 905 (labeled "item") to the "return" grid 725, as represented by a dashed arrow 910. Node 905 represents an XML document in, for example, a shopping cart. System 10 adds an ITEM object 915 in the underlying query model. In the generated unified query, system 10 passes the XML argument into the unified query as a runtime parameter, as shown by a query segment 920. System 10 identifies data coming from input arguments identifies as a variable and passes the identified data into the query using "?" to identify runtime parameters.

Figure 10:
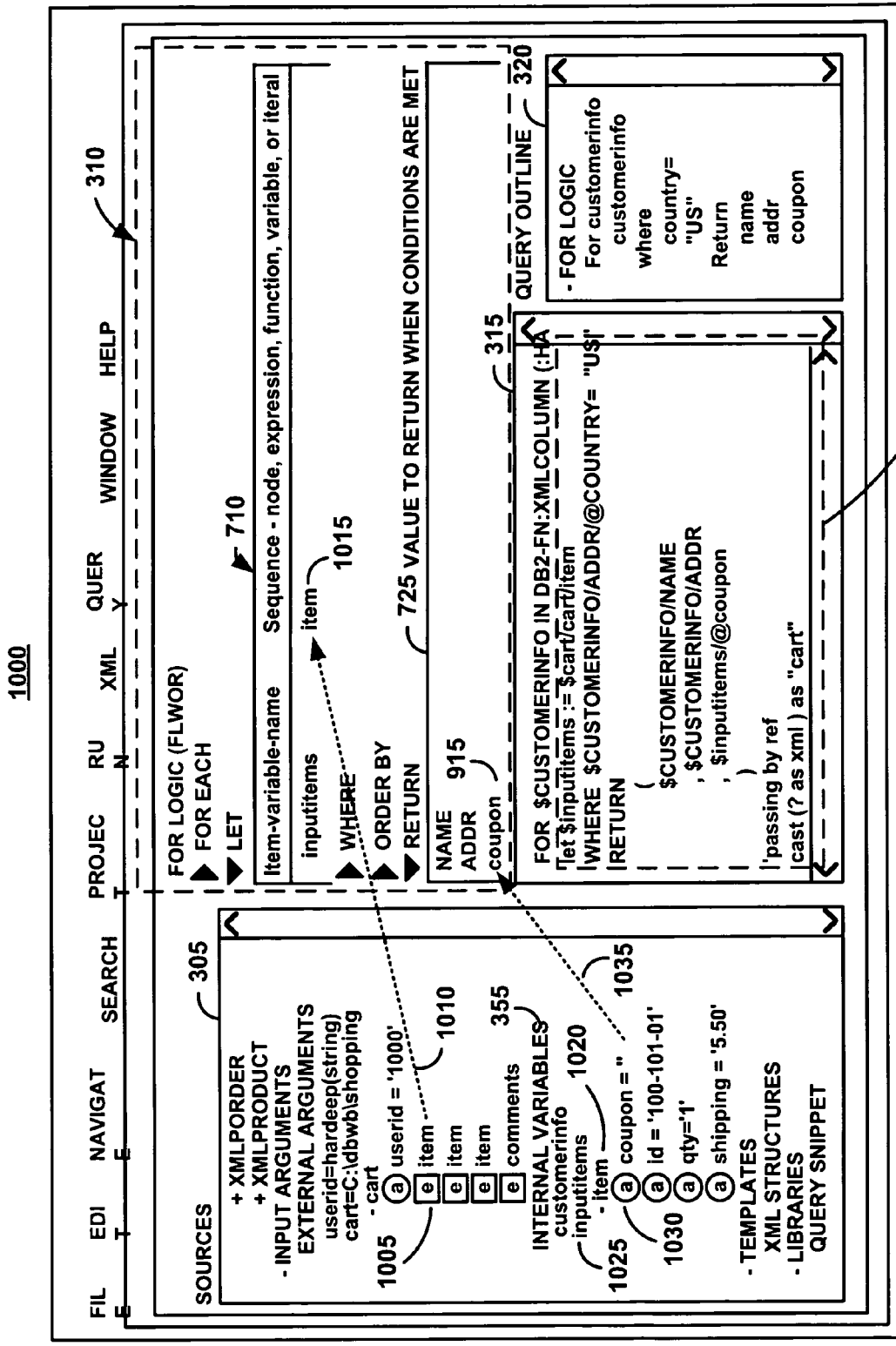
FIG. 10 is an exemplary screen shot illustrating inclusion of an external argument in as an internal variable in a unified query generated by the unified query building system of FIGS. 1 and 2.

FIG. 10 illustrates an exemplary screen shot 1000 in which system 10 includes an external argument as an internal variable in a generated unified query for data such as, for example, XML data and variables created for internal SQL queries. The user drags a node 1005 (labeled "item") from the source tree into the "let" grid 710, as represented by a dashed arrow 1010. System 10 generates a variable, an "item" 1015, representing node 1005. System 10 displays "item" 1015 along with the data structure it represents as a node 1020 under node 1025 (labeled "inputitems") under internal variables 355. System 10 thus enables the user to drag child nodes in this variable represented by node 1020 into the query design view 310. For example, the user can drag node 1030 (labeled "coupon=") to the return grid 725, as represented by a dashed arrow 1035. System 10 generates query segment 1040 in response. Query segment 1040 comprises @coupon, a child attribute in the variable "inputitmes", created from the input argument "cart".

With a single source structure type (a hierarchy or additional hierarchies), the user can proceed in dragging nodes from the node hierarchy (tree) into one or more grids in the query design canvas 310 to generate a unified query. System 10 further simplifies the process of generating a unified query by blurring the distinction between languages. Generating a unified query is accomplished by abstracting the query logic rather than by directly exposing the query syntax or logic to the user. System 10 utilizes known relationships between different data types in the defined data source schemas of the data structure input 240 and uses this information to generate nesting of queries.

Figure 11A:
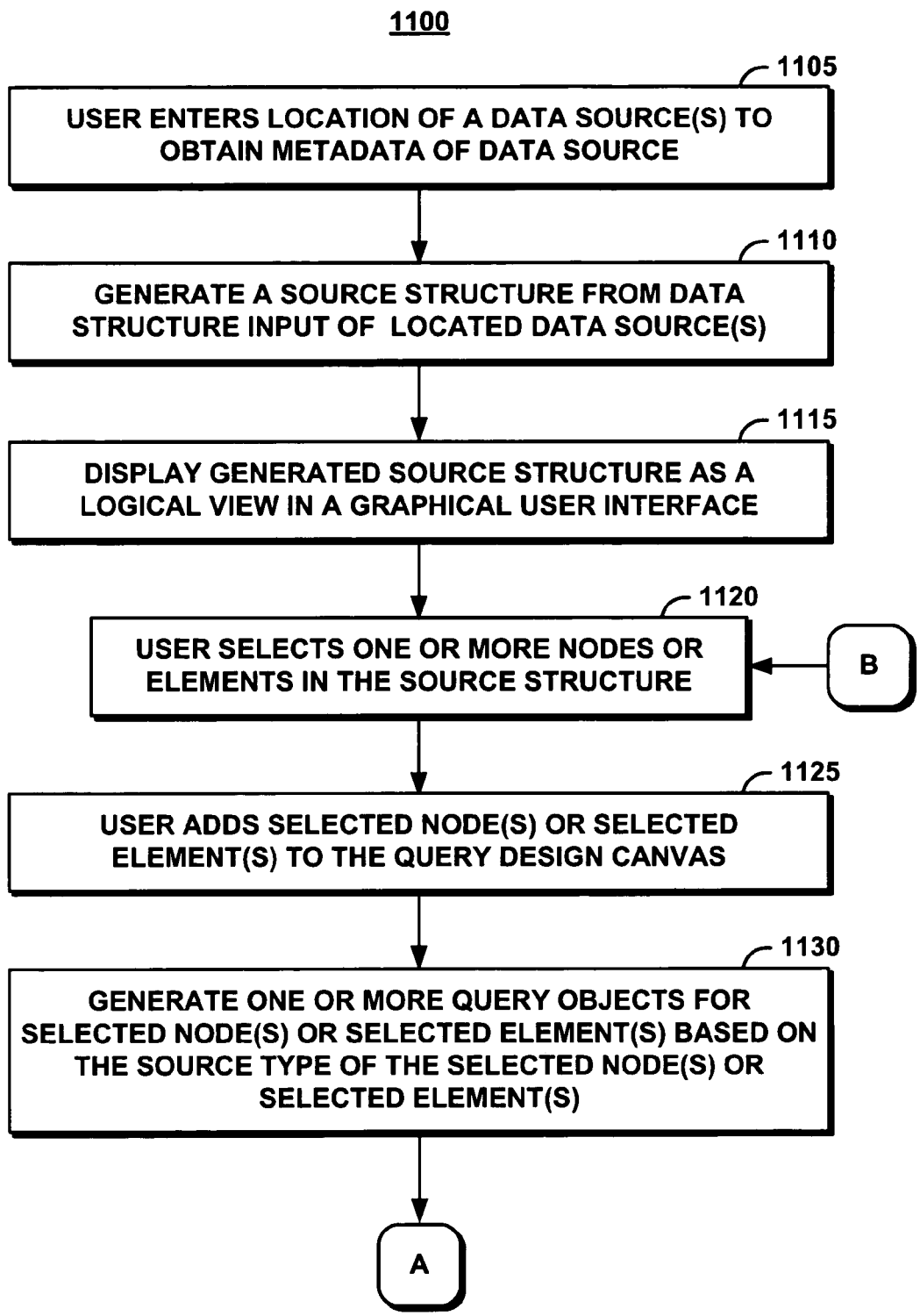
FIG. 11 is comprised of FIGS. 11A and 11B, and represents a process flow chart illustrating a method of operation of the unified query building system of FIGS. 1 and 2.
Figure 11B:
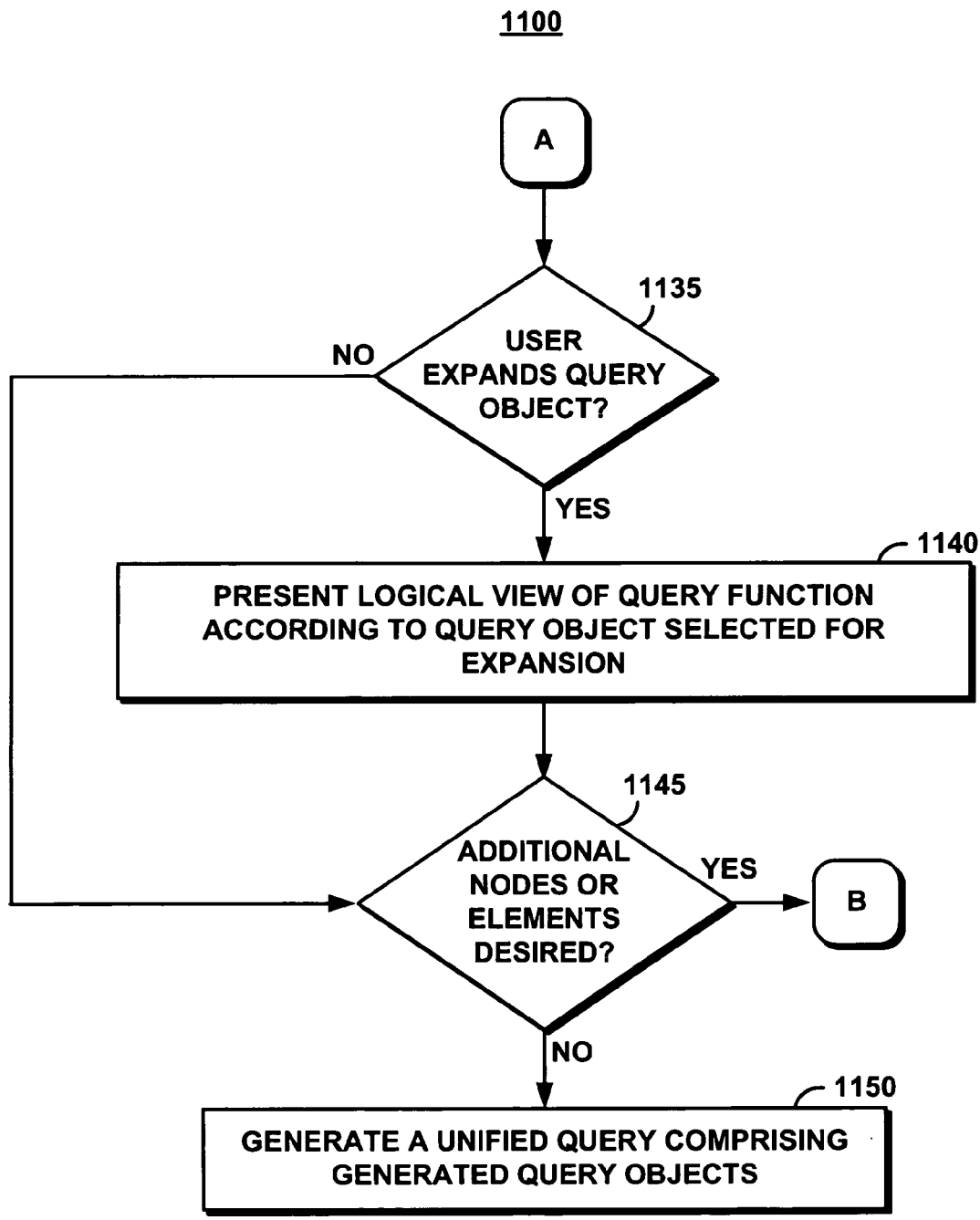

FIG. 11 (FIGS. 11A, 11B) illustrates an exemplary method 1100 of system 10 in generating a unified query. A user enters a location of one or more data sources from a heterogeneous environment to obtain metadata of the data source (step 1105) to use as the data structure input 240. System 10 generates a source structure from the data structure of the located data sources (step 1110). System 10 displays the generated source structure as a logical view in a graphical user interface such as the sources display 305 (step 1115). In one embodiment, the source structure is a tree. The user selects one or more nodes or one or more elements in the source structure (step 1120). The user adds the selected nodes or selected elements to the query design canvas 310 (step 1125). System 10 generates one or more query objects for the selected nodes or selected elements based on the source type of the selected nodes or the selected elements (step 1130).

If the user expands the query object (decision step 1135) by selecting the query object, selecting an expansion button, etc., system 10 presents a logical view of the query function according to the query object selected for expansion (step 1140). If the user does not expand a query object, the user determines whether additional nodes or elements or desired in the query (decision step 1145). If yes, processing returns to step 1120 and the user selects one or more nodes or elements in the source structure. Otherwise, system 10 generates a unified query for the heterogeneous environment represented by the source structure comprising the generated query objects (step 1150). The generated unified query is based on relationships between sources selected in step 1105. For example, if two objects placed in the query design canvas 310 by the user were from the same database and in two different columns, system 10 determines whether those two columns are in the same table, in the same schema, etc.

System 10 allows a user to directly query data sources, generating results that can be transformed into various formats. An application using system 10 does not need to import data into the application. For example, a user can use system 10 to query an invoice, perform an XLST transformation, and generate a web page. Querying data sources directly implies that data does not need to be imported into an application. Consequently, system 10 reduces resources required to manage data transfer from the data source 30 to users. For example, conventional database management systems comprise a middle tier of computers and application servers for managing data. System 10 eliminates the need for this middle tier. System 10 enables a flexible, secure, and relatively inexpensive environment for querying data in data sources. This tool creates the queries that the database actually executes.

It is to be understood that the specific embodiments of the invention that have been described are merely illustrative of certain applications of the principle of the present invention. Numerous modifications may be made to the system and method for building a unified query that spans heterogeneous environments described herein without departing from the spirit and scope of the present invention.

What is claimed is:

1. A processor-implemented method of building a unified query that spans heterogeneous environments using a computer comprising:

identifying a data source location by a user;

causing the computer to generate a source structure comprising a plurality of nodes from a data structure input of an identified data source, wherein the identified data source includes at least one of a plurality of heterogeneous query languages;

causing the computer to present the generated source structure in a logical view, wherein the logical view includes a hierarchical presentation of the identified data source;

adding a node selected by a user from the plurality of nodes to a design query canvas;

causing the computer to generate a query object from the node based on a source type of the selected node;

causing the computer to present a logical view of a query function of a selected query object, wherein the logical view presents a plurality of common query language logical constructs abstracted from the plurality of heterogeneous query languages;

selecting the query function for operation on the node by the user; and causing the computer to generate the unified query comprising the generated query object, the unified query configured to directly query the identified data source, wherein the unified query includes an embedded expression corresponding with the at least one of the plurality of heterogeneous query languages.

2. The method of claim 1, wherein the logical view is displayed in a graphical user interface.

3. The method of claim 1, wherein the design query canvas comprises a query design view.

4. The method of claim 3, wherein the design query canvas further comprises having grids for generating a query for an extensible markup language.

5. The method of claim 3, wherein the design query canvas further comprises element and attribute grids for generating a query for an extensible markup language.

6. The method of claim 1, further comprising displaying the generated unified query in an actual query view.

7. The method of claim 1, wherein the query object is configurable to comprise a SQl (Structured Query language) object responsive to a SQl data source and is also configurable to comprise an XMl (eXtensible Markup language) object responsive to being based on an XMl data source.

8. The method of claim 1, wherein a unified query is configured to comprise a SQl (Structured Query language) query, a SQUXMl (eXtensible Markup language) query, an XQuery (XMl QUERY language), and an XSlT (eXtensible Stylesheet language Transformations) query.

9. The method of claim 1, further comprising:
adding a second selected node from the plurality of nodes to the design query canvas;
generating a second query objected from the second selected node based on a source type of the second selected node, wherein the unified query comprises the generated query object and the second generated query object.

10. A processor-implemented system of building a unified query that spans heterogeneous environments, comprising:
a data structure input for generating a source structure comprising a plurality of nodes from a data structure input of an identified data source;
a parser for presenting the generated source structure in a logical view, wherein the logical view includes a hierarchical presentation of the identified data source;
user input actions for adding a selected node from the nodes to a design query canvas;
a presentation module for generating a query object from the selected node based on a source type of the selected node;
a display module for presenting a logical view of a query function of a selected query object, wherein the logical view presents a plurality of common query language logical constructs abstracted from the plurality of heterogeneous query languages;
user input actions for selecting the query function for operation on the node; and
a transformer for generating a unified query comprising the generated query object.

11. The system of claim 10, wherein the selected node comprises an element.

12. The system of claim 10, further comprising a graphical user interface for displaying the logical view.

13. The system of claim 10, wherein the design query canvas comprises a query design view.

14. The system of claim 10, wherein the parser includes an XML parser.

15. A computer program product having program codes for building a unified query that spans heterogeneous environments using a computing device, comprising:
a computer usable medium:
a program code for generating a source structure comprising a plurality of nodes from a data structure input of an identified data source;
a program code for presenting the generated source structure in a logical view, wherein the logical view includes a hierarchical presentation of the identified data source;
a program code for adding a selected node from the nodes to a design query canvas;
a program code for generating a query object from the selected node based on a source type of the selected node;
a program code for presenting a logical view of a query function of a selected query object, wherein the logical view presents a plurality of common query language logical constructs abstracted from the plurality of heterogeneous query languages;
a program code for selecting the query function for operation on the node by the user; and
a program code for generating a unified query comprising the generated query object.

16. The computer program product of claim 15, wherein the selected node comprises an element.

17. The computer program product of claim 15, further comprising a graphical user interface for displaying the logical view.

18. The computer program product of claim 15, wherein the design query canvas comprises a query design view.

19. The computer program product of claim 15, wherein the parser includes an XML parser.

* * * * *